Patented Nov. 24, 1942

2,302,733

UNITED STATES PATENT OFFICE 2,302,733

COMPOUNDS OF THE DIBENZANTHRONE SERIES

Charles A. Young and William A. Gey, Wilmington, Del., assignors to E. I. du Pont de Nemours & Company, Wilmington, Del., a corporation of Delaware No Drawing. Application May 8, 1940, Serial No. 333,938

6 Claims. (Cl. 260—355)

This invention relates to the preparation of new compounds of the dibenzanthrone series, and more particularly to the preparation of new dialkylol and dicyclo-alkylol ethers of Bz-2,Bz-2'-dihydroxydibenzanthrone which are valuable dyes and intermediates for the preparation of other dyes and color compounds.

U. S. Patent 2,183,627 by Dr. Otto Stallmann describes the preparation of mono-alkylol ethers of Bz-2,Bz-2'-dihydroxydibenzanthrone. As pointed out in that patent, under the conditions disclosed, only one alkylol group is introduced into the Bz-2,Bz-2'-dihydroxydibenzanthrone even where a large excess of the alkylene oxide is employed and temperatures above those normally required are used. To render the mono-alkylol compounds fast to alkalies the second hydroxy group on the dibenzanthrone molecule was etherified by further alkylation with compounds such as dimethyl sulfate, paratoluenesulfonic acid methyl ester or with other alkylating agents of the types previously used in the preparation of the alkyl ethers of dihydroxydibenzanthrone.

It is an object of this invention to provide a method for preparing dialkylol- and dicyclo-alkylol-ethers of Bz-2,Bz-2'-dihydroxydibenzanthrone.

It is a further object of the invention to produce new dialkylol- and dicyclo-alkylol-ethers of Bz-2,Bz-2'-dihydroxydibenzanthrone which, in themselves, exhibit desirable dyeing properties and which also serve as intermediates for the preparation of valuable color bodies for dyeing fibers of all kinds, and for coloring oils, waxes, resins, lacquers and plastic materials.

We have found that new and valuable compounds of the dibenzanthrone series can be prepared by reacting Bz-2,Bz-2'-dihydroxydibenzanthrone with alkylene or cyclo-alkylene oxides at elevated temperatures in the presence of heterocyclic bases such as pyridine, piperidine, quinoline, etc., which bases appear to catalyze the alkylation of dihydroxydibenzanthrone to give the dialkylol and dicyclo-alkylol ethers. In the absence of the heterocyclic bases only the mono-ether derivatives are produced under otherwise similar conditions.

The alkylation may be carried out in inert organic solvents such as benzene, solvent naphtha, "Petroleum Naphtha," ortho-dichloro-benzene, or in an excess of the alkylene oxide itself. The alkylation is preferably carried out at temperatures of from 80 to 200° C. Higher temperatures may be employed where high boiling solvents are used or where the reaction is carried out under pressure.

The alkylene oxides which may be employed may be those of either the aliphatic or cycloaliphatic series which contain an oxygen bridge connecting adjacent carbon atoms in the aliphatic or cycloaliphatic chain. As illustrative of this type of alkylene oxides may be mentioned ethylene oxide, propylene oxide, isobutylene oxide, substituted phenylalkylene oxides such as 1-phenyl-2,3-propylene oxide, and cyclohexene oxide.

The dialkylol and dicyclo-alkylol ethers of Bz-2,Bz-2'-dihydroxy-dibenzanthrone may be employed as vat dyestuffs. They dissolve in the usual alkaline hydrosulfite vat with a blue color from which they dye cotton in bluish green shades of good fastness properties. When esterified with the long chain carboxylic or carbonic acids as more particularly described in U. S. Patent 2,183,629 and in copending application Serial No. 298,398, they give products which possess excellent solubility in oils, mineral oils, waxes, resins of a great variety of kinds, synthetic plastics and lacquers. In such materials they impart a strong and persistent fluorescence. The sulfuric acid, phosphoric acid or other acidic esters of these dialkylol and dicyclo-alkylol compounds dye wool, silk, and nylon in bright green shades. The dyeings on such fibers show good fastness to light.

According to the present invention the dihydroxydibenzanthrone can be completely alkylated in a single operation to give dyestuffs which are fast to alkalies and which, because of the second hydroxy group in the molecule, on esterification with sulfuric acid give products that exhibit greater water solubility than the monoalkylol derivatives. In the main, the dialkylol and dicycloalkylol derivatives when converted to the sulfuric acid derivatives dye silk and wool in appreciably bluer shades than the monoalkylol derivatives and make available desirable bright green shades that exhibit excellent fastness properties. Such colors have heretofore not been available in this or in other classes of acid wool dyestuffs.

The following examples are given to further illustrate the invention: The parts used are by weight.

Example 1

An amount of technical filter press cake containing 30 parts of Bz-2,Bz-2'-dihydroxydibenzanthrone is stirred into 300 parts of ortho-dichloro-benzene; the mass is then distilled free from water at a final temperature of 160° C. and then cooled below 30° C. To the remaining suspension there are added 30 parts of propylene oxide, three parts of piperidine and 30 parts more of ortho-dichloro-benzene. The mass is heated in an iron autoclave under agitation for 12 hours at 165–170° C. and at a pressure of from 5 to 10 pounds. It is then cooled to room temperature and filtered. The filter cake is steam distilled free from solvent, the resulting dye suspension is filtered, and the cake dried at 100° C.

The product, thus obtained, is a bronzy, violet crystalline solid, unstable in warm concentrated sulfuric acid, and soluble in all common inert high boiling solvents at elevated temperatures with a blue color and a reddish brown fluorescence. It dyes cotton from a blue hydrosulfite vat in bright bluish-green shades which are fast to dilute acids and alkalis, as is characteristic of dialkyl ethers of dihydroxydibenzanthrone. It is di-(beta-hydroxy-propyl)-ether of Ez-2,Bz-2'-dihydroxydibenzanthrone.

While the compound possesses some solubility in oil, gasoline, and in other organic materials imparting a strong blue coloration with a pronounced reddish-brown fluorescence, its solubility in all kinds of organic materials may be greatly increased by converting the product into aliphatic carboxylic or carbonic esters, according to the methods described in U. S. P. 2,183,629 and in co-pending U. S. application, Serial No. 298,398.

The product may be converted by side chain sulfation into a valuable wool and silk dyestuff of a bluish-green shade. This sulfation may be carried out as follows:

*Example 2*

7.5 parts of the di(beta-hydroxy-propyl)-ether of Bz-2,Bz-2'-dihydroxydibenzanthrone described in Example 1 are dissolved in 60 parts of 80% sulfuric acid at 5–15° C. 20 parts of 96% sulfuric acid are then slowly added to the mass at 20° C. and the solution is stirred at this temperature for one hour. The reaction product is isolated by diluting the mass with water, filtering off the precipitated color, treating the color with an excess of sodium carbonate, then filtering off the sodium salt and drying at 90–100° C. The side chain sulfation product may be dyed from the usual acid dyeing bath at the usual dyeing temperatures on silk, wool and nylon in bluish-green shades of excellent fastness properties.

*Example 3*

50 parts of technical Bz-2,Bz-2'-dihydroxydibenzanthrone are suspended in 500 parts of ortho-dichloro-benzene, and 5 parts of pyridine and 50 parts of cyclo-hexene oxide are added. The mass is heated under agitation for 16 hours at 165–175° C., and cooled to room temperature. The reaction product, which is precipitated from the crude reaction mass in the form of large, bronzy, violet crystals, is filtered off, the cake is washed free from ortho-dichloro-benzene with alcohol and dried at 100° C.

The product may be further purified by dissolving 65 parts of these crystals in 2500 parts of boiling trichloro-benzene, filtering the solution at 200–210° C. and allowing the filtrate to cool to room temperature. The highly crystalline precipitate is filtered off and freed from the solvent by washing the cake with alcohol and drying the product. The purified di-(beta-hydroxy-cyclohexyl)-ether of Bz-2,Bz-2'-dihydroxydibenzanthrone, thus obtained, is considered as having the formula:

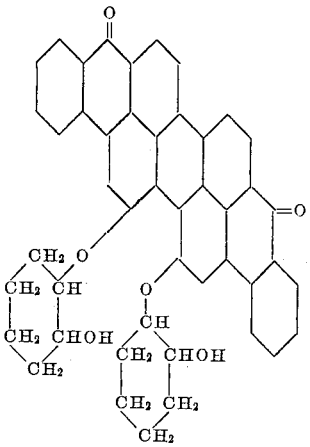

It dyes cotton from a blue vat in weak greenish-blue shades which are fast to dilute acids and alkalis. This product is unstable in warm, concentrated sulfuric acid, and is soluble in all common inert high boiling solvents with a blue coloration and an intense reddish fluorescence.

The solubility of the product in oils, gasolines, waxes, and all kinds of other organic material is greatly increased, without, however, appreciably changing the coloring shade of the product in these materials, by converting the hydroxy compound into the laurate or the ethyl carbonic ester according to the methods described in U. S. P. 2,183,629 and in co-pending U. S. application, Serial No. 298,398.

The side chains sulfation of the product may be carried out by the method described in Example 2 or it may be performed by treatment of dry pyridine solutions of the color with pyridine-sulfur trioxide. In the latter method a solution of one part of the color in approximately 10 parts of pyridine is heated with one to two parts of pyridine-sulfur trioxide at 60 to 90° for one hour. The reaction product may be isolated by diluting the mass with water containing an excess of soda ash, removing the pyridine by steam distilling under reduced pressure and filtering off the precipitated sodium salt, which is practically insoluble in aqueous cold salt solutions. It may be dyed from the usual acid dyeing bath at the usual dyeing temperatures on silk, wool and nylon in bluish-green shades of excellent fastness properties.

*Example 4*

20 parts of technical Bz-2,Bz-2'-dihydroxydibenzanthrone is stirred into 200 parts of cyclo-hexene oxide containing 5 parts of pyridine. The mass is heated under agitation at 118–120° for 2½ hours and then cooled to room temperature. To the mass are added 400 parts of ethyl alcohol and the precipitated product is filtered off, washed with alcohol and dried at 100° C. The violet powder which is obtained may be further purified by recrystallization from high boiling solvents, such as ortho-dichlorobenzene, trichloro-benzene or nitrobenzene. The purified compound is identical with the corresponding purified product of Example 3. On steam distilling the filtrate from the diluted reaction mass until it is free from solvent there is obtained a quantity of polymeric material which dissolves readily in the common inert organic solvents, forming red solutions with an intense greenish-yellow fluorescence.

Example 5

14.5 parts of purified Bz-2,Bz-2'-dihydroxydibenzanthrone are suspended in 250 parts of ortho-dichlorobenzene containing 3 parts of pyridine. To the suspension is added under agitation at 170–175° C. during ½ hour 30 parts of 1-phenyl-2,3-propylene oxide, and the mass is refluxed for 12 hours longer. At the end of this time the reaction mass is cooled to room temperature and filtered to remove the small amount of inorganic impurities which are present. 700 parts of ethyl alcohol are then added slowly to the filtered reaction mass and the mixture is allowed to stand for 16 hours. The precipitated product is filtered off, washed with alcohol until free from ortho-dichloro-benzene and dried at 100° C. The reaction product is purified by slurrying it with 15 parts of pyridine, vatting the slurry in a solution of 10 parts of sodium hydroxide and 15 parts of sodium hydrosulfite in 1000 parts of water at 65–70° C., filtering the vat, and air-blowing the filtrate at 90° C. The purified dyestuff is filtered off, washed alkali-free and dried. The product is a brownish-violet powder which is unstable in warm concentrated sulfuric acid. It dyes cotton from a blue vat in greenish-blue shades which are fast to dilute acids and alkalis. It is di-(phenyl-beta-hydroxypropyl) ether of Bz-2,Bz-2'-dihydroxydibenzanthrone.

If the condensation of 1-phenyl-2,3-propylene oxide with Bz-2,Bz-2'-dihydroxydibenzanthrone is carried out in the absence of pyridine or other catalytic materials, only the mono-phenyl-beta-hydroxy-propyl ether is obtained. It dyes cotton from a blue vat in greenish-blue shades which are fast to dilute acid, but changes in dilute alkalis to a very yellowish-green, which is characteristic of the dyeings of the mono-alkyl ethers of dihydroxydibenzanthrone.

Example 6

5 parts of the mono-(phenyl-beta-hydroxypropyl)-ether of Bz-2,Bz-2'-dihydroxydibenzanthrone, described in Example 5 are suspended in 150 parts of ortho-dichloro-benzene containing one part of pyridine and 20 parts of cyclohexene oxide. The mass is agitated at 170–180° C. for 12 hours, and is then cooled to room temperature and mixed with 300 parts of ethyl alcohol. The precipitated product is filtered off, the cake is washed with alcohol until free from ortho-dichloro-benzene and dried at 100° C. The product is the mono-(phenyl-beta-hydroxy-propyl)-mono-(beta-hydroxy-cyclo-hexyl)-ether of Bz-2,Bz-2'-dihydroxydibenzanthrone. It dyes cotton from a blue vat in greenish-blue shades which are fast to dilute acids and alkalis.

As illustrated in Example 6, the mono-alkylol and mono-cycloalkylol ethers of Bz-2,Bz-2'-dihydroxydibenzanthrone as more particularly described in U. S. P. 2,183,627 may be further alkylated with the alkylene and cyclo-alkylene oxides according to the process above described wherein organic bases are employed to catalyze the reaction.

It will be obvious to those skilled in the art that the process as specifically set forth in the above examples may be varied within wide limits. The amount of the reactants may be varied within wide limits. The alkylene oxide may be employed in an amount only slightly in excess of theory or it may be used to replace the solvent in which the reaction is carried out.

We claim:

1. The compounds of the class consisting of the di-alkylol and di-cyclo-alkylol ethers of Bz-2,Bz-2'-dihydroxydibenzanthrone, and their sulfation products.

2. Compounds of the class consisting of the di-alkylol and di-cyclo-alkylol ethers of Bz-2,Bz-2'-dihydroxydibenzanthrone.

3. Di(beta-hydroxy-propyl) ether of Bz-2,Bz-2'-dihydroxydibenzanthrone.

4. The sulfation products of di(beta-hydroxy-propyl) ether of Bz-2,Bz-2'-dihydroxydibenzanthrone.

5. The process for preparing di-alkylol and di-cyclo-alkylol ethers of Bz-2,Bz-2'-dihydroxydibenzanthrone which comprises heating Bz-2,Bz-2'-dihydroxydibenzanthrone with an alpha-beta-alkylene oxide of the group consisting of those of the aliphatic and cyclo-aliphatic series in the presence of a heterocyclic base, the reaction being carried out until both hydroxy groups on the dibenzanthrone molecule are alkylated.

6. The process for preparing sulfation derivatives of di-alkylol and di-cyclo-alkylol ethers of Bz-2,Bz-2'-dihydroxydibenzanthrone which comprises heating Bz-2,Bz-2'-dihydroxydibenzanthrone with an alpha-beta-alkylene oxide of the group consisting of those of the aliphatic and cyclo-aliphatic series in the presence of a heterocyclic base, the reaction being carried out until both hydroxy groups on the dibenzanthrone molecule are alkylated, and sulfating the resulting product.

CHARLES A. YOUNG.
WILLIAM A. GEY.